United States Patent Office 3,814,802
Patented June 4, 1974

3,814,802
N-SUBSTITUTED IMIDAZOLES, AS ANTIMYCOTIC AGENTS

Wilfried Draber, Helmut Timmler, Karl Heinz Buchel, and Manfred Plempel, Wuppertal-Elberfeld, Germany, assignors to Farbenfabriken Bayer AG, Leverkusen, Germany
No Drawing. Original application Oct. 21, 1971, Ser. No. 191,495. Divided and this application Apr. 6, 1973, Ser. No. 348,585
Claims priority, application Germany, Oct. 29, 1970, P 20 53 080.7
Int. Cl. A61k 27/00
U.S. Cl. 424—273                                   40 Claims

ABSTRACT OF THE DISCLOSURE

Antimycotic agents of the formula:

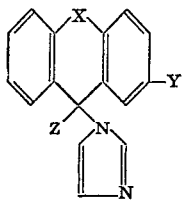

wherein
X is a carbon-carbon bond, oxygen, sulfur, ethylene or vinylene;
Y is hydrogen or halogen; and
Z is lower alkyl, lower alkenyl, lower alkynyl or cycloalkyl of 3 to 6 carbon atoms, are prepared from thionyl-bis-imidazole and the appropriate fused dibenzocarbinol. A typical embodiment is 9-methyl-9-imidazolylfluorene.

---

This is a division of application Ser. No. 191,495, filed Oct. 21, 1971.

The present invention relates to new N-substituted imidazoles and their salts, to a process for their production, and to their use in human veterinary medicine as antimycotic agents.

In particular the invention pertains to N-substituted imidazoles of the formula:

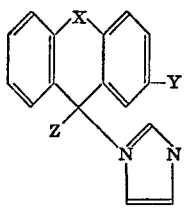

in which:

X is a direct carbon-carbon bond, oxygen, sulfur, ethylene (—CH$_2$—CH$_2$—) or vinylene (—CH=CH—);
Y is hydrogen or halogen; and
Z is lower alkyl, lower alkenyl, lower alkynyl or cycloalkyl;

and to the salts thereof.

These new imidazoles and salts are antimycotically active, and also show activity against plant-pathogenic fungi and yeasts as well as against bacteria and protozoa, such as trypanosoma and trichomonadae.

The invention further provides a process for the production of the new N-substituted imidazoles and salts comprising allowing an alcohol of the formula:

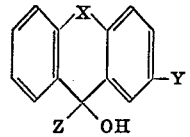

in which X, Y and Z are as defined above, to react with thionyl-bis-N,N'-imidazole of the formula:

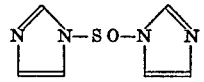

to produce an imidazole derivative of formula (1) and, when a salt is desired, converting the imidazole to a pharmaceutically acceptable salt.

The reaction can be typified by the following equation:

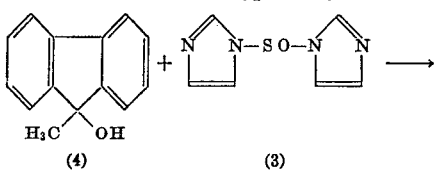

X can be oxygen or sulfur but is preferably a carbon-carbon bond, ethylene or vinylene.

Y can be hydrogen or fluorine, chlorine, bromine or iodine, preferably fluorine, chlorine or bromine, and most preferably chlorine.

By the term lower alkyl is intended a branched or straight chain hydrocarbon group of from 1 to 6 carbon atoms, preferably 1 to 4 carbon atoms, such as methyl, ethyl, propyl, isopropyl, butyl, isobutyl, sec butyl, pentyl, neopentyl, hexyl and the like. Lower alkenyl and lower alkynyl refer to similar groups bearing a non-terminal double or triple bond, respectively, but having a minimum of 2 carbon atoms, preferably 2 to 3. Cycloalkyl groups contain 3 to 6 carbon atoms, and can be substituted by one or more, preferably no more than two, lower alkyl groups, preferably methyl.

The most important salts of the imidazoles of the formula (1) are the pharmaceutically acceptable salts formed with physiologically compatible acids. Examples of such acids are the hydrohalic acids such as hydrobromic acid and hydrochloric acid, especially hydrochloric acid; phosphoric acids; sulfonic acids such as 1,5-naphthalene-sulfonic acid; mono- and bifunctional carboxylic acids such as acetic acid, maleic acid, succinic acid, and sorbic acid; and hydroxy acids such as citric acid, salicyclic acid and lactic acid.

The alcohols of the formula (2), employed as starting materials in the process of the invention, are either known or can be obtained by known methods.

The reaction optionally can be carried out in any inert organic solvent as for example aromatic hydrocarbons such as benzene and toluene; ethers such as diethyl ether and tetrahydrofuran; halogenated hydrocarbons such as dichloromethane and chloroform; and lower alkanonitriles such as acetonitrile. Particularly preferred solvents are lower alkanonitriles, especially acetonitrile, and ethers, especially tetrahydrofuran.

The reaction temperature can be varied within a fairly wide range, but generally is from about −10 to about 120° C., preferably from about 20° C. to about 85° C.

Generally about 1 mol of thionyl-bis-N,N'-imidazole (3) is used for every mole of alcohol (2). In order to achieve more rapid progress of the reaction, it is advantageous to employ an excess of from 0.1 to 1 mol of thionyl-bis-N,N'-imidazole per mol of the alcohol; the process can, however, also be carried out with essentially equimolar amounts of the two reactants.

The free bases can be converted to the salts of the invention by known methods such as through treatment with acid (which in turn can be reconverted through treatment with the base).

Isolation and purification of the products can be effected by conventional techniques such as crystallization, chromatography and the like.

Examples of the imidazoles of the present invention according to formula (1) are the following:

TABLE 1

| Compound number: | X | Y | Z |
|---|---|---|---|
| 1 | Direct bond | H | $CH_2-$ |
| 2 | do | H | $n-C_4H_9-$ |
| 3 | $-CH_2-CH_2-$ | H | $CH_3-$ |
| 4 | Direct bond | H | $CH_2=CH-CH_2-$ |
| 5 | do | H | $(CH_3)_2CH-$ |
| 6 | do | H | $C_2H_5-$ |
| 7 | do | Cl | $C_2H_5-$ |
| 8 | do | Cl | $CH_3-$ |
| 9 | do | H | $n-C_3H_7-$ |
| 10 | $-CH=CH-$ | H | $CH_3-$ |
| 11 | $-CH_2-CH_2-$ | H | $CH_2=CH-CH_2-$ |

The new compounds' strong antimycotic effects can be conveniently observed both *in vivo* and *in vitro*. Typical results in well-known methods are described below.

MICROBIOLOGICAL ACTIVITY OF THE NEW ACTIVE INGREDIENTS (a) Antimycotic activity in vitro As seen from the minimal inhibition concentrations (MIC) set forth in Table 2, the compounds show wide-ranging *in vitro* activity against human- and animal pathogenic fungi, including dermatophytes as well as mold fungi and yeasts.

TABLE 2

| | MIC as γ/ml. substrate against— | | | | |
|---|---|---|---|---|---|
| Compound of Table 1 | Trichophyton mentagrophytes | Microsporon canis | Aspergillus niger | Penicillium commune | Candida albicans |
| Number: | | | | | |
| 1 | 4 | 10 | 40 | 40 | 20 |
| 2 | <1 | <1 | 1 | 1 | 0 |
| 3 | <1 | 4 | <1 | 4 | 4 |
| 4 | <1 | 4 | 4 | 4 | 44 |
| 5 | <1 | 4 | 1 | <1 | 40 |
| 6 | <1 | 4 | 10 | 10 | 14 |
| 7 | 1 | 4 | 10 | 10 | 1 |
| 8 | <1 | 10 | 4 | 100 | 10 |
| 9 | <1 | 4 | 1 | 1 | |
| 10 | 4 | 10 | <1 | <1 | 1 |
| 11 | <1 | 4 | 4 | 10 | |

The MIC values were determined
(a) For dermatophytes and mould fungi on Sabouraud's *milieu d'epreuve*;
(b) For yeasts on meat broth-glucose broth.

The incubation temperature was 28° C.; the incubation period was 24–96 hours. The MIC values of Table 2 were determined in a serial dilution test with concentrations of the preparations of 100, 40, 20, 10, and 1 γ/ml. substrate.

The activity of the compounds is primarily fungistatic, fungicidal activity being observed at from about 6 to 10 times the minimal inhibition concentration.

(b) Antimycotic activity in vivo (Effect against gemmiparous infections.)

Male white mice of the strain $SPF-CF_1$, are intravenously infected in the tail vein with $2 \times 10^6$ cells of a 24 hours' culture of *Candida albicans*. A candidaemia lasting for about 16 hours develops, followed by a Candida mycosis from which untreated control animals die between the 3rd and 6th day *post infectionem*.

When animals infected in this way are treated *per os* by gavage twice daily at intervals of 7 hours for 6 days with doses of between 50 mg./kg. body weight to 150 mg./kg. body weight of the compounds Nos. 1, 3, 8, 9 of Table 1, which may be taken as representative of these N-substituted imidazoles, then 12 out of 20 animals survive after administrations of 50 mg./kg.; 16 out of 20 animals survive after administrations of 75 mg./kg.; and 18 out of 20 animals survive after administrations of 100 mg./kg. and 150 mg./kg. In the untreated control group, 2 out of 20 animals survive on the 6th day *post infectionem*.

(c) Effect against dermatomycoses (I) Oral application.—When the non-scarified backs of male white mice of the strain $SPF-CF_1$ are infected on with a spore suspension of *Trichophyton quinckeanum*, a typical dermatomycosis with scutula formation develops within 12 days *post infectionem*.

Following therapy with the compounds according to the invention, for example, compounds Nos. 1 and 2 of Table 1, applied in a dosage of $2 \times 75$ or $2 \times 100$ mg./kg. body weight daily *per os*, starting on the day of infection, dermatomycosis and the scutula formation can be substantially suppressed, scutula forming on 2 to 5 out of 20 animals on the 12th day *post infectionem*. Among the untreated control animals, 18 out of 20 mice exhibit scutula on the 12th day *post infectionem*.

(II) Local application.—The non-scarified backs of male white guinea pigs of the strain Pearl-brght-white are infected with a spore suspension of *Trichophyton mentagrophytes*. A typical dermatomycosis with loss of hair and bleeding ulcerations develops at the point of infection within 16 days. The individual stages of the infection are characterized with evaluation numbers from 1 to 5, denoting 0 = no signs of infection
1 = slight reddening
2 = reddening with inflammatory changes of the skin
3 = strong reddening and loss of hair
4 = total loss of hair in the area of infection and onset of bleeding ulceration
5 = bleeding ulceration of the whole area of infection.

The following table gives, by way of example, the effect of compound No. 2 of Table 1 in comparison with the untreated control. Treatment was carried out once daily with a 1% solution of the active ingredient in polyethylene glycol 400 by slightly rubbing 0.5 ml. of the solution onto the area of infection from the 4th day to the 14th day *post infectionem*.

TABLE 3

| Day | 4th | 5th | 6th | 7th | 8th | 9th | 10th | 11th | 12th | 13th | 14th |
|---|---|---|---|---|---|---|---|---|---|---|---|
| Control group animal: | | | | | | | | | | | |
| 1 | 0/1 | 1 | 1 | 2 | 3 | 3/4 | 4/5 | 5 | 5 | 5 | 5 |
| 2 | 0 | 1 | 1/2 | 1/2 | 3 | 3 | 4 | 4/5 | 5 | 5 | 5 |
| 3 | 0/1 | 1 | 1 | 2 | 3 | 3/4 | 4 | 4/5 | 5 | 5 | 4/5 |
| Therapy group animal: | | | | | | | | | | | |
| 1 | 0/1 | 0/1 | 1 | 1 | 2 | 2 | 1/2 | 1 | 1 | 1 | 1 |
| 2 | 0/1 | 0/1 | 1 | 1 | 1 | 1/2 | 1/2 | 1/2 | 1 | 1 | 1 |
| 3 | 1 | 1 | 1 | 1 | 1 | 1/2 | 1/2 | 1 | 1/2 | 1 | 1/2 |

These results show the compounds according to the invention to be highly active antimycotics which have a broad spectrum of activity and significant therapeutical effects on either oral or topical application. The compounds are thus indicated in human medicine for dermatomycoses caused by dermatophytes, mold fungi and yeasts; and for organomycoses caused by gemmiparous fungi, biphasic fungi and species of mold fungi; as well as veterinary medicine for skin and organomycoses in domestic cattle and pets caused by dermatophytes, yeasts and mold fungi.

As stated above, the invention also pertains to the pharmaceutical and veterinary use of these new imidazoles and salts. Accordingly, the present invention provides antimycotic pharmaceutical compositions containing as an active ingredient at least one of the new imidazoles and pharmaceutically acceptable salts of the general formula (1) in admixture with a pharmaceutically acceptable solid or liquid diluent or carrier as hereinafter defined.

In the present specification, the expression "pharmaceutically acceptable diluent or carrier" refers to a non-toxic substance that when mixed with the active ingredient and ingredients renders it suitable for administration. Other pharmaceutically acceptable ingredients such as salts in correct quantities to render the composition isotonic, buffers, surfactants, coloring and flavoring agents and preservatives can be present. Examples of suitable solid, liquid, and semi-solid diluents and carriers include buffered aqueous solutions; aqueous solutions rendered isotonic by addition of glucose and/or salts; non-toxic organic solvents such as paraffins and petroleum fractions, vegetable oils such as peanut/sesame oil, alcohols such as ethyl alcohol, glycerol, glycols such as propylene glycol and polyethylene glycol; natural stone meals such as kaoline, aluminas, talc, chalk, synthetic stone meals such as highly disperse silicic acid and silicates, and sugars such as raw sugar, lactose and glucose.

Examples of pharmaceutical compositions according to the invention are ointments, pastes, creams, sprays, lotions, aqueous suspensions, elixirs, syrups, granules and powders, either free-flowing or compressed into tablets.

The compounds and pharmaceutically acceptable salts of the present invention may be administered perorally, parenterally or locally.

One group of preferred pharmaceutical compositions of the invention are those adapted for oral administration. The diluents and carriers used are preferably therefore those that adapt the active ingredient or ingredients for oral administration. Examples of such diluents and carriers are solid vehicles, excipients and lubricants such as glucose, lactose and sucrose, corn and potato starch, sodium carboxymethyl cellulose, ethyl cellulose and cellulose acetate, powdered gum tragacanth, gelatin, alginic acid, agar, stearic acid, sodium, calcium and magnesium stearates, sodium lauryl sulfate, polyvinyl-pyrrolidone, sodium citrate, calcium carbonate, and dicalcium phosphate.

The pharmaceutical compositions of the invention may also contain other non-toxic adjuvants and modifiers such as dyes, surfactants, as for example, non-ionic or anionic emulsifiers such as polyoxyethylene-fatty acid esters, polyoxyethylene fatty alcohol ethers, alkyl-sulfonates and arylsulfonates; and dispersing agents such as lignin, sulfite waste liquors, methyl cellulose, starch and polyvinylpyrrolidone; perfumes; flavoring agents; preservatives; and biocides.

The compounds and pharmaceutically acceptable salts of the invention may also be administered parenterally. The diluents or carriers used are therefore preferably those that adapt the active ingredient for parenteral administration. Examples of such diluents and carriers are solvents and suspending diluents such as water and water-miscible organic solvents, in particular sesame oil, groundnut oil, aqueous propylene glycol, and N,N-dimethylformamide. Examples of pharmaceutical compositions of the invention are sterile isotonic saline aqueous solutions of the active ingredient, which may be buffered with a pharmaceutically acceptable buffer and are preferably pyrogen-free.

The new imidazoles and their pharmaceutically acceptable salts can also be administered locally, pharmaceutical compositions for local application contain, for example, 1% by weight of the active ingredient in a carrier, e.g., a 1% solution of the active ingredient in polyethylene glycol 400.

The pharmaceutical compositions of the invention generally contain from about 0.1 to about 99.5% by weight, preferably 0.5 to 99% of a new imidazole or pharmaceutically acceptable salt of the invention. In general, it has proved advantageous to administer amounts of 20 to 150, preferably 50 to 75, mg./kg. of body weight twice every 24 hours, in order to achieve effective results. However, one can deviate from the above dosages, dependent on the type and body weight of the object to be treated, the type and gravity of the disese, the type of formulation and application of the therapeutical agent, and the point in time or time interval at which application takes place.

For example, it may be sufficient in some cases to use less than the aforesaid minimum amount, whereas in other cases the above upper limit will have to be exceeded. The same range of dosage is envisaged for application in human and veterinary medicine.

The present invention also provides antimycotic medicaments in dosage unit form as hereinafter defined comprising as an active ingredient at least one imidazole of general formula (1) given above or a pharmaceutically acceptable salt thereof, either alone or in admixture with a pharmaceutically acceptable solid or liquid diluent or carrier.

The expression "medicament in dosage unit form" as used in the present specification means a medicament in the form of discrete portions each containing a unit dose or a multiple or sub-multiple of a unit dose of the active ingredient, for example, one, two, three or four unit doses or a half, a third or a quarter of a unit dose. A "unit dose" is the amount of the active ingredient to be administered on one occasion and will usually be a daily dose, or for example a half, a third, or a quarter of a daily dose depending on whether the medicament is to be administered once or, for example, twice, three times, or four times a day.

The discrete portions constituting the medicament in dosage unit form can include a protective envelope. The active ingredient can be undiluted and contained in such an envelope, or can be mixed with a pharmaceutically acceptable solid or liquid diluent or carrier as defined above. Such portions can for example be in monolithic coherent form, such as tablets, lozenges, pills, suppositories, or dragées; in wrapped or concealed foam, the active ingredients being within a protective envelope, such as wrapped powders, cachets, sachets, capsules, or ampules; or in the form of a sterile solution suitable for parenteral injection, such as ampoules of buffered, isotonic, sterile, pyrogen-free aqueous solution; or in any other form known in the art.

As stated above, it is preferred to administer the new imidazoles of general formula (1) or their salts perorally. Preferred medicaments in dosage unit form according to the invention are therefore those adapted for oral administration, such as tablets, pills, dragées, capsules, and cachets, as well as wrapped powders containing the active ingredient in powdered form with a powdered diluent or carrier for suspension in water before being taken.

As stated above it is also possible to administer the new imidazoles and pharmaceutically acceptable salts parenterally. Preferred medicaments in dosage unit form according to the invention are therefore those adapted for parenteral injection, such as ampoules containing a measured quantity of a sterile isotonic saline injectable aqueous solution of the new active ingredient, which may be buffered with a pharmaceutically acceptable buffer and are preferably free of pyrogens.

The preferred unit dose for administration of the medicaments of the invention is 1,000–13,5000 mg. of active ingredient, preferably 2,500 to 6,750 mg. This will normally be administered twice daily.

The inveniton further provides a method of combating mycotic infection in an animal which comprises administering to the animal (preferably parenterally, topically or perorally) the imidazole derivative or a pharmaceutically acceptable salt thereof, alone or in a pharmaceutical composition in dosage unit form.

The invention will be further typified by the following examples.

EXAMPLE 1

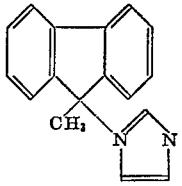

(5)

19.6 g. (0.1 mol) 9-hydroxy-9-methyl-fluorene are mixed at room temperature with a solution of 0.13 mol thionyl-bis-imidazole in 200 ml. acetonitrile. The mixture is then allowed to stand for one hour and subsequently heated at boiling temperature for 3 hours. It is subsequently concentrated by evaporation, and the residue is digested with water and taken up with ether. The ether phase is shaken several times with water, dried, concentrated to about 150 ml. and mixed with n-pentane. The 9-methyl-9-imidazolyl-fluorene is precipitated in the form of colorless small needles. The product is filtered off with suction, washed with ether/pentane and dried. Yield 18.9 g. (77% of theory); M.P. 139° C.

The 9-hydroxy-9-methyl-fluorene required as starting material is prepared according to F. Ullmann and R. V. Wurstemberger, Ber. 38, 4105 (1905), from fluorenone and methyl magnesium iodide.

EXAMPLE 2

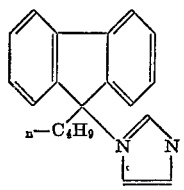

(6)

23.8 g. (0.1 mol) 9-hydroxy-9-butyl-fluorene are mixed at room temperature with a solution of 0.13 mol thionyl-bis-imidazole in 150 ml. tetrahydrofuran. After standing for one hour, the mixture is heated at boiling temperature for 3 hours, concentrated by evaporation, and mixed with water. The precipitate is taken up with ether, the ether solution is shaken with water and dried with sodium sulphate. Dry gaseous hydrogen chloride is then introduced. The syrupy precipitate is separated and taken up in water. The mixture is filtered with active charcoal, rendered alkaline with a sodium hydroxide solution, taken up with ether, dried and concentrated. When the oily residue is treated with ether/petroleum ether, crystallisation occurs. There are obtained 6.0 g. (21% of theory) 9-butyl-9-imidazolyl-fluorene in the form of colorless crystals of M.P. 108° C.

The starting material, 9-hydroxy-9-butyl-fluorene, is obtained in the following way:

36.0 g. (0.2 mol) fluorenone in 200 ml. ether are slowly mixed with 0.4 mol n-butyl magnesium bromide at −5° C. The mixture is subsequently stirred at room temperature over night, and decomposed with dilute hydrochloric acid. After drying and concentration of the ether phase, there remains a red oil which crystallizes after the addition of some n-pentane and trituration. There are obtained 31.2 g. (66% of theory) of M.P. 125° C.

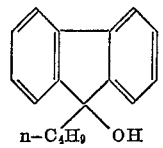

(7)

EXAMPLE 3

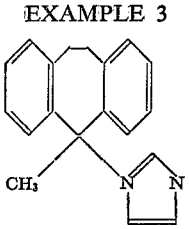

(8)

22.4 g. (0.1 mol) 5-hydroxy - 5 - methyl-dibenzo-[a,d]-cycloheptane are mixed with a solution of 0.15 mol thionyl-bis-imidazole in acetonitrile, and the mixture is boiled until the evolution of gas subsides. It is then diluted with ice-water. The precipitate which is partly oily and partly solid is taken up in chloroform. After drying and concentrating, there is obtained a yellow oil which crystallises after the addition of a little ether/pentane. Recrystallization from which spirit yields the 5-methyl-5-imidazolyl-dibenzo-[a,d]-cycloheptane in the form of colourless small needles of M.P. 159° C. Yield 11.1 g. (41% of theory).

The 5-hydroxy-5-methyl-dibenzo - [a,d] - cycloheptane used as starting material is prepared according to the instructions of W. Treibs and H. J. Klinkhammer, Chem. Ber. 83, 367 (1950).

EXAMPLE 4

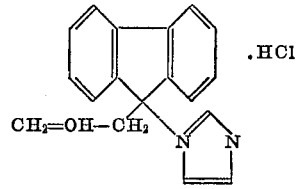

(9)

38.5 g. 9-hydroxy-9-allyl-fluorene are dissolved in 175 ml. acetonitrile and mixed at room temperature with a solution of thionyl-bis-imidazole obtained from 70.5 g. imidazole by the reaction with 18.4 ml. thionyl chloride in 350 ml. acetonitrile. After standing overnight, the mixture is heated at boiling temperature for one hour. The residue remaining after distillation is digested with water and taken up in ethyl acetate. The oiling residue remaining after the ethyl acetate has been distilled off is converted into the hydrochloride with the aid of ethereal hydrochloric acid. The 9-allyl-9-imidazolyl-fluorine hydrochloride has a M.P. of 175° C. (from ethyl acetate/methylene chloride). Yield 39 g. (72% of theory).

The 9-hydroxy-9-allyl-fluorene required as starting material can be obtained in the following way:

36 g. (0.2 mol) fluorenone dissolved in 200 ml. ether are slowly mixed with 0.4 mol allyl magnesium bromide at 0° C. After stirring at room temperature overnight, the mixture is decomposed with ice-water/hydrochloric acid. 38.5 g. (86% of theory) of colorless crystals of M.P. 117° C. are obtained in this way.

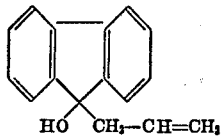

The compounds listed in Table 1 are prepared described in Example 1 to 4.

TABLE 1

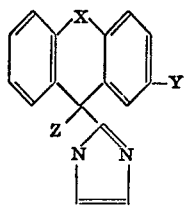

| Example number | X | Y | Z | M.P., °C. |
|---|---|---|---|---|
| 5 | Direct bond | H | CH(CH₃)₂ | 125 |
| 6 | do | H | C₃H₅ | ¹ 215 |
| 7 | do | Cl | C₂H₅ | ¹ 215 |
| 8 | do | Cl | CH₃ | 130 |
| 9 | do | H | n-C₃H₇ | 133 |
| 10 | —CH=CH— | H | CH₃ | 188 |
| 11 | —CH₂—CH₂— | H | CH₂—CH=CH₂ | ¹ 168 |

¹ Hydrochloride.

What is claimed is:

1. A pharmaceutical composition comprising an antimycotically effective amount of a compound of the formula:

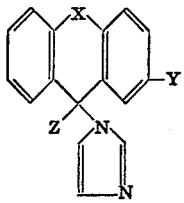

wherein
X is a carbon-carbon bond, ethylene or vinylene;
Y is hydrogen or halogen; and
Z is lower alkyl or lower alkenyl;
or a pharmaceutically acceptable acid addition salt thereof, in combination with a pharmaceutically acceptable non-toxic inert diluent or carrier.

2. A composition according to claim 1 in oral administration form.

3. A composition according to claim 1 in parenteral administration form.

4. A composition according to claim 1 in topical administration form.

5. A composition according to claim 1 wherein

X is a carbon-carbon bond, ethylene or vinylene;
Y is hydrogen, fluoro, chloro or bromo; and
Z is lower alkyl or alkenyl of 2 to 3 carbon atoms.

6. A composition according to claim 5 wherein the lower alkyl moiety contains 1 to 4 carbon atoms.

7. A composition according to claim 1 wherein

X is a carbon-carbon bond, ethylene or vinylene;
Y is hydrogen or chloro; and
Z is lower alkyl or allyl.

8. A composition according to claim 1 wherein the compound is in the form of a salt and the salt is selected from the group consisting of the hydrobromide, the hydrochloride, the phosphate, the 1,5-naphthalene sulfonate, the acetate, the maleate, the succinate, the sorbate, the citrate, the salicylate and the lactate.

9. A composition according to claim 1 wherein the compound is 9-methyl-9-imidazolylfluorene.

10. A composition according to claim 1 wherein the compound is 9-n-butyl-9-imidazolylfluorene.

11. A composition according to claim 1 wherein the compound is 5-methyl-5-imidazolyldibenzo[a,d]cycloheptane.

12. A composition according to claim 1 wherein the compound is 9-allyl-9-imidazolylfluorene.

13. A composition according to claim 1 wherein the compound is 9-isopropyl-9-imidazolylfluorene.

14. A composition according to claim 1 wherein the compound is 9-ethyl-9-imidazolylfluorene.

15. A composition according to claim 1 wherein the compound is 2-chloro-9-ethyl-9-imidazolylfluorene.

16. A composition according to claim 1 wherein the compound is 2-chloro-9-methyl-9-imidazolylfluorene.

17. A composition according to claim 1 wherein the compound is 9-n-propyl-9-imidazolylfluorene.

18. A composition according to claim 1 wherein the compound is 5-methyl-5-imidazolyldibenzo[a,d]cycloheptene.

19. A composition according to claim 1 wherein the compound is 5-allyl-5-imidazolylcyclo[a,d]cycloheptane.

20. A method of treating mycosis in humans and animals which comprises administering to said humans or animals an antimycotically effective amount of a compound of the formula:

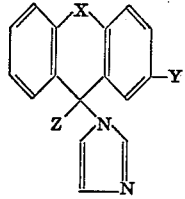

wherein
X is a carbon-carbon bond, ethylene or vinylene;
Y is hydrogen or halogen; and
Z is lower alkyl or lower alkenyl;
or a pharmaceutically acceptable acid addition salt thereof.

21. A method according to claim 20 wherein the administration is oral.

22. A method according to claim 20 wherein the administration is parenteral.

23. A method according to claim 20 wherein the administration is by topical application.

24. A method according to claim 20 wherein the antimycotically effective amount is from 20 to 150 mg./kg. twice daily.

25. A method according to claim 20 wherein the antimycotically effective amount is from 50 to 75 mg./kg. twice daily.

26. A method according to claim 20 wherein
X is a carbon-carbon bond, ethylene or vinylene;
Y is hydrogen, fluoro, chloro or bromo; and
Z is lower alkyl or alkenyl of 2 to 3 carbon atoms.

27. A method according to claim 26 wherein the lower alkyl moiety contains 1 to 4 carbon atoms.

28. A method according to claim 20 wherein
X is a carbon-carbon bond, ethylene or vinylene;
Y is hydrogen or chloro; and
Z is lower alkyl or allyl.

29. A method according to claim 20 wherein the compound is in the form of a salt and the salt is selected from the group consisting of the hydrobromide, the hydrochloride, the phosphate, the 1,5-naphthalene sulfonate, the acetate, the maleate, the succinate, the sorbate, the citrate, the salicylate and the lactate.

30. A method according to claim 20 wherein the compound is 9-methyl-9-imidazolylfluorene.
31. A method according to claim 20 wherein the compound is 9-n-butyl-9-imidazolylfluorene.
32. A method according to claim 20 wherein the compound is 5-methyl-5-imidazolyldibenzo[a,d]cycloheptane.
33. A method according to claim 20 wherein the compound is 9-allyl-9-imidazolylfluorene.
34. A method according to claim 20 wherein the compound is 9-isopropyl-9-imidazolylfluorene.
35. A method according to claim 20 wherein the compound is 9-ethyl-9-imidazolylfluorene.
36. A method according to claim 20 wherein the compound is 2-chloro-9-ethyl-9-imidazolylfluorene.
37. A method according to claim 20 wherein the compound is 2-chloro-9-methyl-9-imidazolylfluorene.
38. A method according to claim 20 wherein the compound is 9-n-propyl-9-imidazolylfluorene.
39. A method according to claim 20 wherein the compound is 5-methyl-5-imidazolyldibenzo[a,d]cycloheptane.
40. A method according to claim 20 wherein the compound is 5-allyl-5-imidazolylcyclo[a,d]cycloheptane.

References Cited

UNITED STATES PATENTS

| | | | |
|---|---|---|---|
| 3,530,183 | 9/1970 | Kyburz et al. | 260—309 |
| 3,547,942 | 12/1970 | Godefroid et al. | 260—309 |
| 3,647,816 | 3/1972 | Draber et al. | 260—309 |
| 3,637,731 | 7/1972 | Johnson | 260—309 |

FOREIGN PATENTS

| | | | |
|---|---|---|---|
| 585,555 | 4/1960 | Belgium | 260—309 |

OTHER REFERENCES

Blicke et al., J. of Am. Chem. Soc., 58, pp. 559–562, 1936.

Lester et al., J.C.S., 68, p. 375–380, 1946.

JEROME D. GOLDBERG, Primary Examiner